June 23, 1970   F. M. ARNDT   3,516,298
WORM GEARINGS

Filed Aug. 22, 1968   4 Sheets-Sheet 1

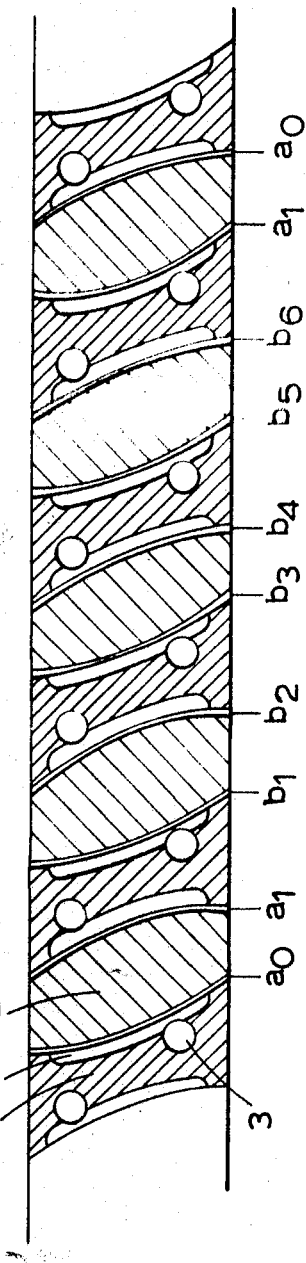
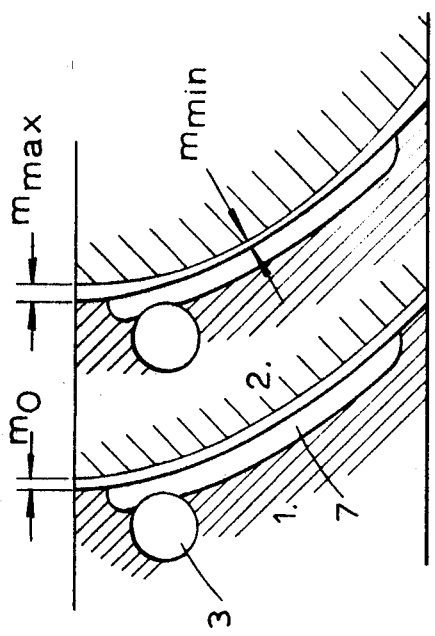

June 23, 1970     F. M. ARNDT     3,516,298
WORM GEARINGS
Filed Aug. 22, 1968     4 Sheets-Sheet 3

June 23, 1970  F. M. ARNDT  3,516,298
WORM GEARINGS

Filed Aug. 22, 1968  4 Sheets-Sheet 4

United States Patent Office 3,516,298
Patented June 23, 1970

3,516,298
WORM GEARINGS
Frans Martin Arndt, Iserlohn, Germany, assignor to Gewerkschaft Eisenhutte Westfalia, a body corporate of Germany
Filed Aug. 22, 1968, Ser. No. 754,556
Int. Cl. F16h *1/16, 55/18, 57/04*
U.S. Cl. 74—427
9 Claims

ABSTRACT OF THE DISCLOSURE

A worm gearing with chambers formed between the gear wheel teeth and the worm thread, which chambers are filled with pressure fluid to form hydrostatic pressure fluid cushions which prevent physical contact between the gear wheel teeth and worm thread.

BACKGROUND OF THE INVENTION

In general, a worm gearing comprises a worm with a thread which engages a tooth or teeth of a toothed gear wheel. Apart from the various types of thread and tooth configurations two main forms of worm gearing are known which are known according to the worm thread longitudinal section as the cylindrical worm gearing and the globoid worm gearing.

Worm gearings having a hardened worm thread are known to have a limited performance dependent upon the wear of the gear teeth wheel caused by frictional contact between the gear wheel and the worm. Lubrication helps to cut down frictional losses but in the case of high gear ratios, the load capacity of the hydrodynamic lubrication pressure can often no longer fully cope with the prevailing load torque. Hence, a large proportion of the drive power is inevitably wasted due to friction. Single worm gearings with a relatively high gear ratio, with normal lubrication are therefore prone to work with a greatly reduced efficiency. Frictional losses depend upon various factors which influence the dynamic lubrication pressure formed between the nominally engaging surfaces of the gearing by its lubricant. For example, it is known that the frictional force at the engaging surfaces increases as the relative sliding speed between the surfaces increases, the force is also dependent upon the radius of curvature in normal section of the flanks of the gear wheel teeth and to the viscosity of the lubricant used.

All cylindrical and globoid worm gearings have these properties in common; while the latter have the advantage over the cylindrical worm gearings that they have a greater number of engaging or bearing surfaces per unit of space. This advantage is however partially offset due to the difficulty of constructing globoid worms. It is also difficult to successfully harden globoid worms and when unhardened the worm has a reduced maximum loading capacity. Since the force derived from the dynamic lubrication pressure exploits only part of the bending strength of the gear wheel teeth and the worm thread an increase of power would be possible by increasing the dynamic lubrication pressure up to a value commensurate with the maximum bending stress or bending strain possible for the gear teeth and worm thread. The result of this proposal would be an increase in gear performance per unit of space. However, in the case of the known worm gearings with hydrodynamic lubrication pressure optimum performance has been reached in this respect.

SUMMARY OF THE INVENTION

A general object of the present invention is to provide an improved worm gearing of better performance than known worm gearings.

According to the present invention there is provided a worm gearing having a toothed gear wheel meshing with a threaded worm the improvement comprising:

(a) a plurality of chambers each formed between a tooth of the gear wheel and the adjacent part of the thread of the worm;

(b) fluid supply passages communicating with said chambers; and (c) a source of pressure fluid connectible to said passages to supply pressure fluid to said chambers so as to form hydrostatic pressure fluid cushions therein which prevent physical contact between the teeth of the gear wheel and the thread of the worm.

The desirable increase in performance is achieved by the use of hydrostatic fluid pressure and between the nominally engaging surfaces of the bearing. This ensures that the gap between the engaging surfaces is dependent upon the static fluid pressure and the quantity of fluid delivered and is independent of the speed of working and of the gear ratio. A gearing of this type would therefore be subjected to pure fluid friction.

In accordance with a preferred embodiment the worm gearing is globoid.

Further according to the invention there is provided a method for inspecting the alignment of a gear wheel and worm of a worm gearing having a plurality of chambers each formed between a tooth of the gear wheel and the adjacent part of the thread of the worm fluid supply passages communicating with said chambers and a source of pressure fluid connectible to said passages to supply pressure fluid to said chambers so as to form hydrostatic pressure fluid cushions therein which prevent physical contact between the teeth of the gear wheel and the thread of the worm, the method comprising making comparative measurement of the unloaded hydrostatic pressure of the fluid cushions on both sides of the engaging worm thread when idling or stationary to ascertain the positional relationship between the gear wheel and worm at which the fluid pressure reaches the maximum in the hydrostatic fluid pressure cushions.

It has been found that assuming a constant fluid pressure the quantity of fluid flowing through the pressurized fluid cushions is proportional to the third power of the depth of gap between the gear wheel teeth and worm thread is directly proportional to the width of the gap and is in inverse proportion to both the height of the gap and to the viscosity of the fluid. Except for the gap depth, all the other factors are determined by constructional design. The flanks of the gear wheel teeth have a constant curvature and a constant mean pitch. During the passage of a gear wheel tooth through its area of nominal engagement with the worm thread the gear tooth flank comes into alignment with the corresponding worm thread flank. The latter varies constantly due to the varying worm flank pitch and to the varying radius of curvature. The mean gap depth between the thread flanks will also vary as a result and thus it is clear that the gap depth decides the desired quantity of pressure fluid and this in combination with the fluid pressure determines the requisite drive power of the fluid pump. According to the pitch formula for a globoidal worm gearing the pitch angle is equal to the gear wheel tooth radius divided by transmission ratio multiplied by worm thread radius. The variable factor in this formula is the worm thread radius and the amount of variation ($\Delta r$) by which the maximum worm thread radius is reduced to the minimum in the middle of the worm thread becomes less, in dependence upon the circular function with increasing gear radius, i.e. increasing gear ratio with a given pitch, for a given number of worm threads in engagement.

With a decreasing amount of variation the pitch angle is also reduced, and thus so are the limits of the gap depth variations. On the other hand the pitch angle can also be reduced by enlargement of the worm thread radii at a given gear ratio or given gear wheel tooth radius.

By reference to these relationships it can be seen that the fluid energy consumption can be generally influenced by constructional design and in this way it is possible to ensure a minimum fluid consumption. Thus the proportion of the requisite drive power for the formation of the hydrostatic fluid pressure in the gap and on the gear tooth flank surface becomes calculable according to given dimensions and physical relationships, taking into consideration the pitch function of the globoidal worm. Such a calculation then shows that the fluid drive power is far lower, in relation to the gear drive power, than the loss of power in a dynamically lubricated worm gearing of equal size transmitting equal power. Due to the prevention of physical contact between the gear wheel teeth and worm thread the gearing is only subjected to pure fluid friction. The hitherto normal self-locking of the gearing becomes practically zero due to the small fluid friction angle which can be influenced by variation of the fluid pressure or the fluid quantity.

The gear wheel teeth can remain soft on account of the low friction involved and the gear wheel undergoes no distortion, does not need to be re-ground and can be produced simply and economically by known methods with minimal surface smoothness. Both gearing parts i.e. gear wheel and worm can be produced from a cheap material such as a structural steel or a cast iron, since they are not subjected to undue wear.

It is expedient to make worm and gear wheel bearings hydrostatic also as the means needed for this purpose are well known in this art. In this case it is possible to use the bearings to adjust the shaft centres or the flank play by varying the fluid pressure in the bearing chambers. This can be achieved by throttles. Thus, it is possible to inspect the central position of the gear teeth in relation to the worm thread gaps by comparative measurement of the throughflow fluid pressure with the gear wheel flanks unloaded. Accordingly, it is possible to set the worm and gear wheel from the exterior, with the gearbox closed, without involving time-consuming adjustment and inking processes.

The power to be expended for the hydrostatic bearings is less than the power loss with anti-friction bearings by undergoing rolling friction, since once again the static mounting works in the range of pure fluid friction.

Thus the extra expense for the fluid delivery system is entirely justified economically by the far greater gain in drive power and power per unit space of the worm gearing made in accordance with this invention.

It should also be mentioned that a certain dynamic lubrication pressure can occur at the narrowest parts of the gap above and below the fluid pressure chambers extending peripherally of the worm. The amount of this lubrication pressure and the bearing capacity thereof are however very slight in comparison with the hydrostatic pressure.

BRIEF DESCRIPTION OF DRAWINGS

FIG. 4 is a sectional view taken along the line E–F of FIG. 1;

FIG. 5 is a diagrammatic representation of the maximum variation of gap size between the gear wheel teeth and worm thread;

DESCRIPTION OF PREFERRED EMBODIMENTS

Figure 2:
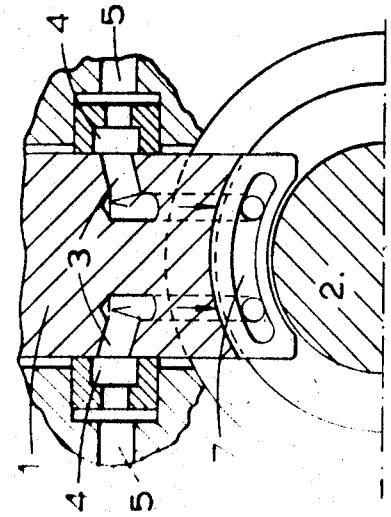
FIG. 2 is a sectional view taken along the line C–D of FIG. 1.
Figure 1:
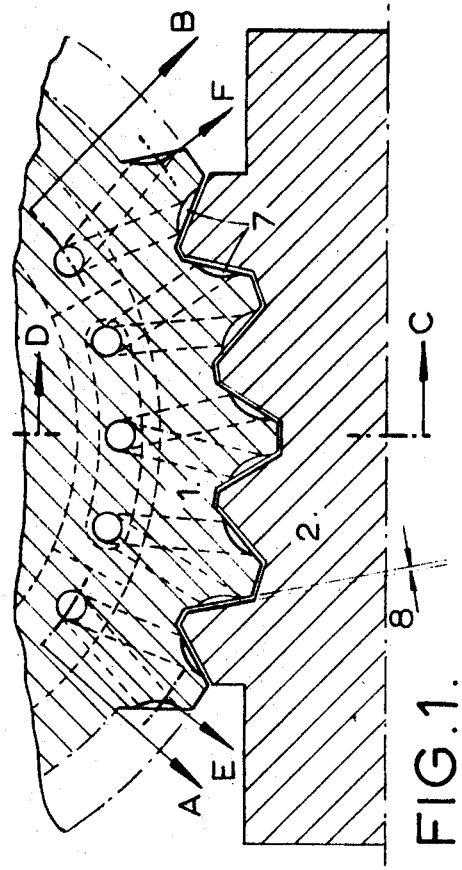
FIG. 1 is a lateral section through a straight-flanked globoid worm gearing made in accordance with the present invention.

As can be seen more particularly in FIG. 1 a globoid worm gearing has a worm 2 and a gear wheel 1. The worm thread can be trapezoidal, involute or arcuate in cross section. The worm 2 has a central, parallel gap 8. Depressions 7 are formed in the flanks of the gear wheel teeth which extend peripherally of the worm 2. The depressions 7 and the worm thread flanks define a plurality of chambers which can be filled with pressure fluid to form a plurality of hydrostatic pressure fluid cushions.

Figure 3:
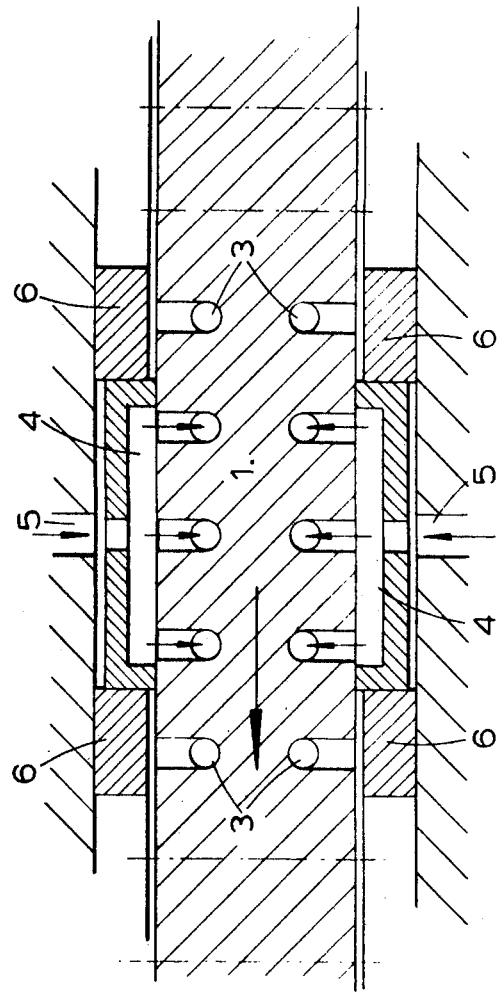
FIG. 3 is a sectional view taken along the line A–B of FIG. 1.

The chambers are supplied with pressure fluid from pressure fluid sources 5 and the fluid can flow to the depressions 7 through distributing elements 4 and passage ways 3 in the gear wheel 1. The pressure fluid path can be best appreciated by considering FIG. 3. The pressure fluid flows from the sources 5 into the distributing elements 4, which are pressed with a force slightly in excess of the pressure of the fluid upon the side faces of the gear wheel 1. The distributing elements 4 conduct the fluid according to need to the passage ways 3 in the gear wheel 1 and thence to the chambers 7. The distribution of the fluid to the individual chambers is according to the dimension of the gaps between the gear wheel teeth and worm thread.

FIG. 4 shows the possible gap variations in the region of engagement between the gear teeth and the worm thread. The letters $a_0$ and $a_1$ designate a constant gap whereas the gaps designated $b_1$–$b_6$ have a variable gap width causing varying curvature in the flank of the gear wheel teeth and/or worm thread.

FIG. 5 shows diagrammatically the two limiting cases relating to the gaps. $m_0$ denotes a parallel gap with constant gap size, whereas $m_{max.}$ and $m_{min.}$ designate the maximum and minimum gap depth respectively. It should be made clear that the variation of gap depth occurs in sections analogous to that depicted in FIGS. 4 and 5. This tendency will be dependent substantially upon the nature of the gear teething and worm thread.

Figure 6:
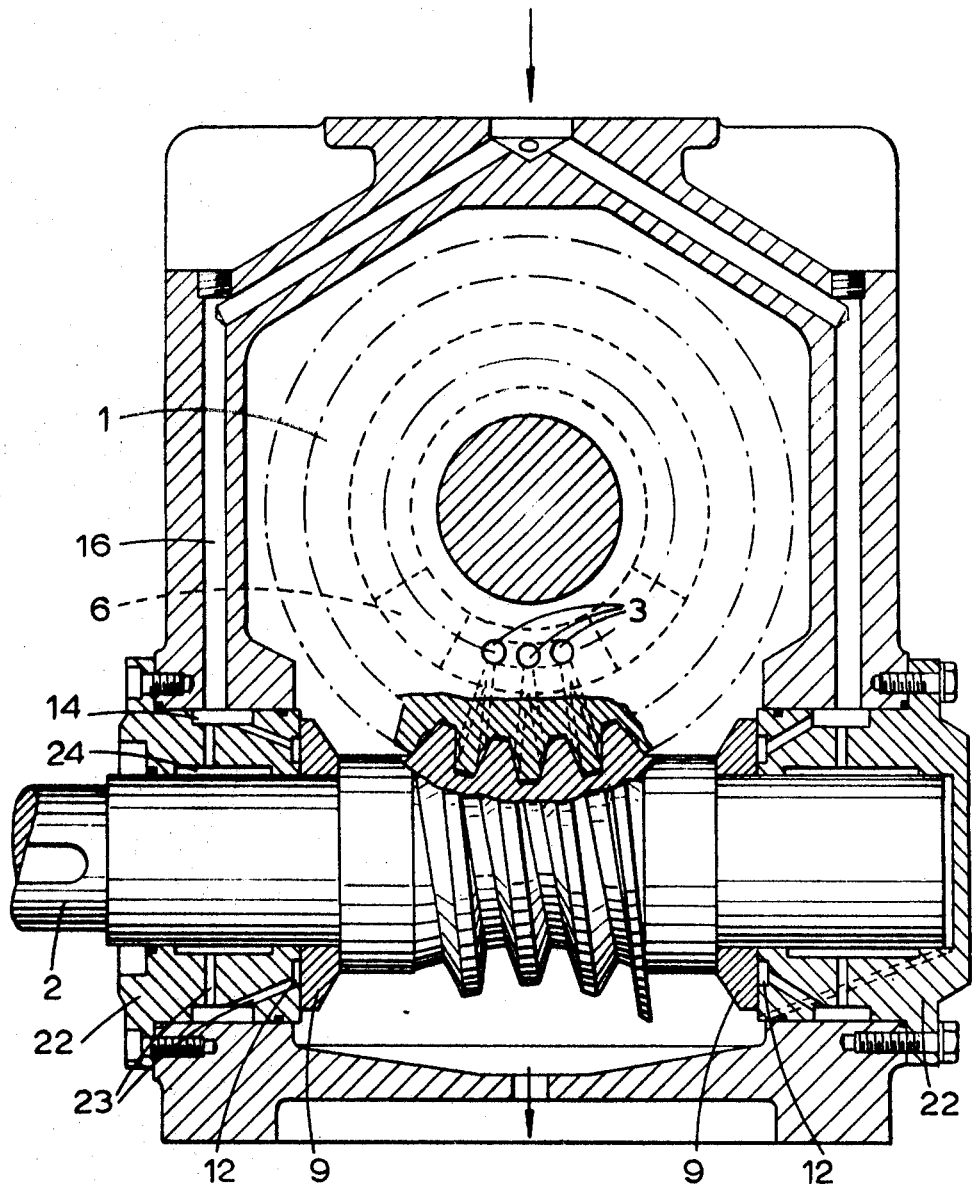
FIG. 6 is a lateral section through the worm shaft of a globoid worm gearing made in accordance with the invention.
Figure 7:
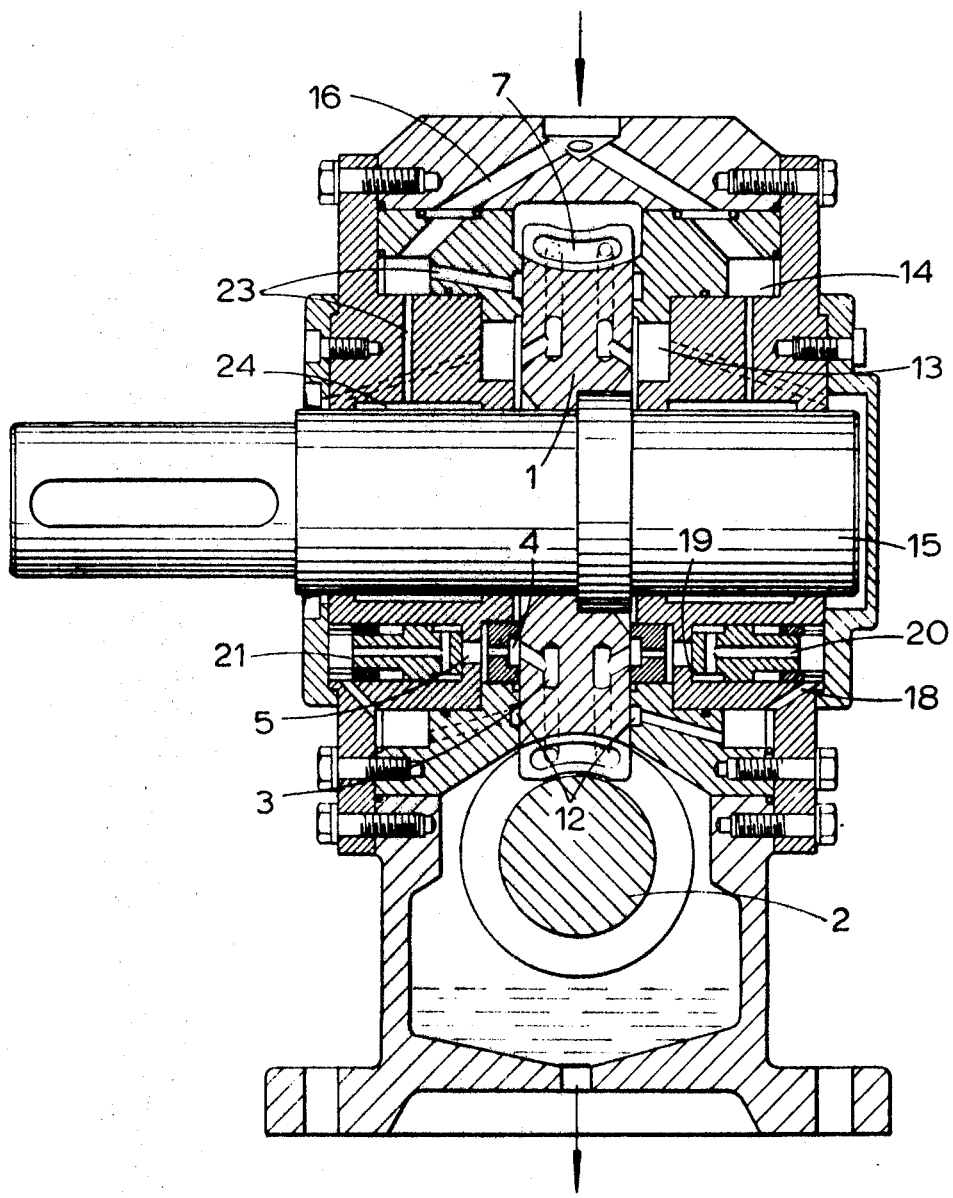
FIG. 7 is an end section through the gear wheel shaft of the gearing shown in FIG. 6.

FIGS. 6 and 7 show a further example of a globoidal worm gearing made in accornance with the invention where like reference numerals designate like parts to those previously mentioned. As shown in FIGS. 6 and 7 pressure fluid from the pump flows through passages 16 in a gearing housing 15 and thence into annular passages 14 and through passages 23 into hydrostatic transverse bearings 24 of the gear wheel 1 and hydrostatic longitudinal bearings 12 of the worm 2. By varying the quantity of fluid supplied to the bearings 12, 24 the alignment of the gear wheel 21 and worm 2 can be effected.

Limiting studs 6 are disposed on the gear wheel 1 for the guidance of distributing elements 4 which are non-displaceably fitted onto return passages 13 to supply pressure fluid to the chamber to form the hydrostatic pressure cushions. The pressure fluid flows from the annular passage 14 of the housing 15 through a connecting bore 18 and into throttle valves 21. These valves 21 have a throttling effect which is in inverse proportion to the prevailing fluid pressure. Thus far more fluid is supplied to the pressure cushions on the loaded flank side of the gear wheel 1 than on the unloaded flank side thereof. The residual fluid flow becomes so small that the pressure in the pressure chambers tends towards zero and thus on the loaded flank side the generated peripheral force becomes fully effective on the gear. The quantity of fluid flowing by way of the distributing elements 4 into the pressure chambers of the gear tooth flanks through the passages 3 in the worm and flowing away through the gaps collects in common with the return fluid from the bearings 24 and 12 in the gear box and is pumped back to the pump and filtered. As shown in the drawing, the gear wheel shaft and gear wheel itself can be produced integrally since no wear occurs in operation and therefore a replaceable gear rim becomes superfluous.

With the gearing made in accordance with the invention the drive torque is transmitted independently of the rotational speed of the worm.

The variation in the curve and pitch of the worm thread and displacement of nominal contact between the worm thread and gear wheel teeth are compensated for by the formation of the fluid pressure cushions.

In the production of such a gearing a cutting tool or finger exactly similar in shape to the gear wheel teeth and enlarged according to the desired clearance between the gear wheel teeth and worm thread can be used to cut the worm thread. The gear wheel teeth can be formed by means of punches or cylindrical holes with no excess demands or tolerance. Flank grinding known hitherto for correcting deviation is now unnecessary.

Since the gearing operates under pure fluid function excessive self-locking which hitherto occurred when the pitch angle of the worm was smaller than the angle of function for the gearing materials is prevented.

Self locking when stationary can be diminished or controlled by control of the fluid pressure.

I claim:

1. In a globoid worm gearing having a toothed gear wheel meshing with a threaded worm the improvement comprising:
    (a) a plurality of chambers each formed between a tooth of the gear wheel and the adjacent part of the thread of the worm;
    (b) fluid supply passages communicating with said chambers; and
    (c) a source of pressure fluid connectible to said passages to supply pressure fluid to said chambers so as to form hydrostatic pressure fluid cushions therein which prevent physical contact between the teeth of the gear wheel and the thread of the worm.

2. A gearing according to claim 1, wherein the thread of the worm has a trapezoidal profile in cross-section.

3. A gearing according to claim 1, wherein the thread of the worm has an involute profile in cross-section.

4. A gearing according to claim 1, wherein the thread of the worm has an arcuate profile in cross-section.

5. A gearing according to claim 1, wherein the worm and gear wheel are produced from a structural steel and wherein the thread of the worm is unhardened.

6. A gearing according to claim 1, wherein the passages are formed in the gear wheel and there is provided distributing segments engaging the sides of the gear wheel and communicating with the passages, said pressure fluid source being connected to the distributing elements to supply pressure fluid to said chambers.

7. A gearing according to claim 1, wherein the worm is mounted in hydrostatic bearings and can be displaced longitudinally to make fine adjustments of the mean clearance between the worm thread and gear wheel teeth by variation of the fluid pressure in said hydrostatic bearings.

8. A gearing according to claim 1, wherein the gear wheel is mounted in hydrostatic bearings and can be displaced radially by variation of the fluid pressure in said hydrostatic bearings.

9. A globoid worm gearing comprising:
    (a) a toothed gear wheel,
    (b) a threaded worm in meshing relationship with the teeth of said gear wheel, with only a small variation in the dimensions of gaps between the teeth of the wheel and the worm thread,
    (c) a plurality of chambers each formed between the flanks of a tooth of the gear wheel and the adjacent part of the thread of the worm,
    (d) fluid supply passages provided in the wheel and communicating with said chambers,
    (e) a source of pressure fluid connectible to supply fluid to said chambers via said passages, and
    (f) means for controlling the flow of fluid to said chambers so that a flank of any tooth of the gear wheel which is loaded and is in full meshing engagement with the thread of the worm is subjected to the action of a hydrostatic pressure fluid cushion formed in its associated chamber.

References Cited

UNITED STATES PATENTS

| | | | |
|---|---|---|---|
| 3,323,385 | 6/1967 | Revitt | 74—425 |
| 3,361,003 | 1/1968 | Hodgson | 74—425 X |
| 3,415,138 | 12/1968 | Rumbarger et al. | 74—409 |
| 3,448,632 | 6/1969 | Rumbarger | 74—409 X |

LEONARD H. GERIN, Primary Examiner

U.S. Cl. X.R.

74—409, 468